Nov. 20, 1951  O. SINGER  2,575,845
TRAVELING ENDLESS TRACKS
Filed June 15, 1948  4 Sheets-Sheet 1
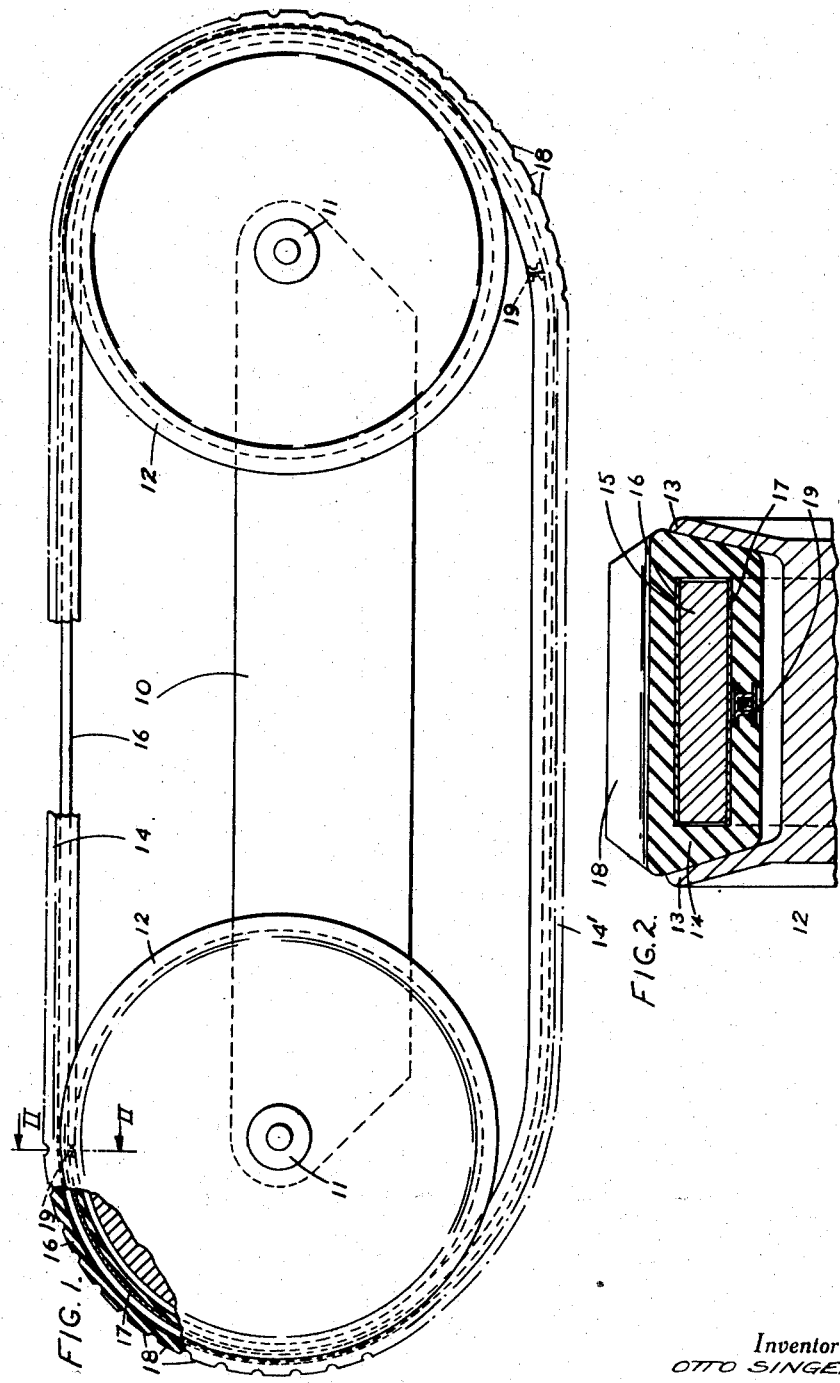
Inventor
OTTO SINGER.
By Robert B. Larson
Attorney Nov. 20, 1951     O. SINGER     2,575,845
TRAVELING ENDLESS TRACKS
Filed June 15, 1948     4 Sheets-Sheet 2
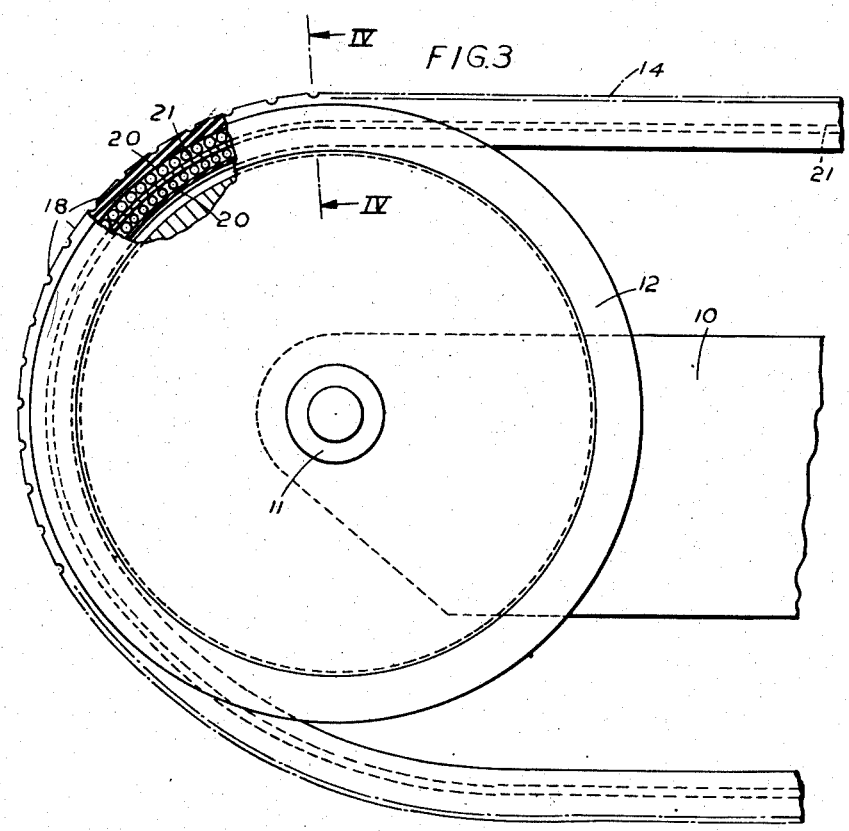
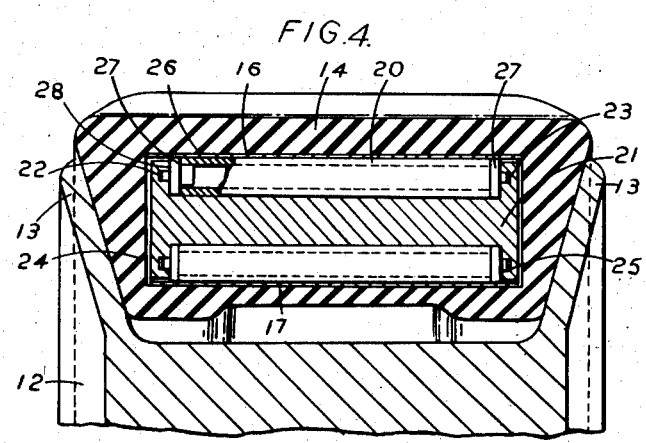
Inventor
OTTO SINGER,
By Robert B. Larson
Attorney Nov. 20, 1951      O. SINGER      2,575,845
TRAVELING ENDLESS TRACKS
Filed June 15, 1948      4 Sheets-Sheet 3
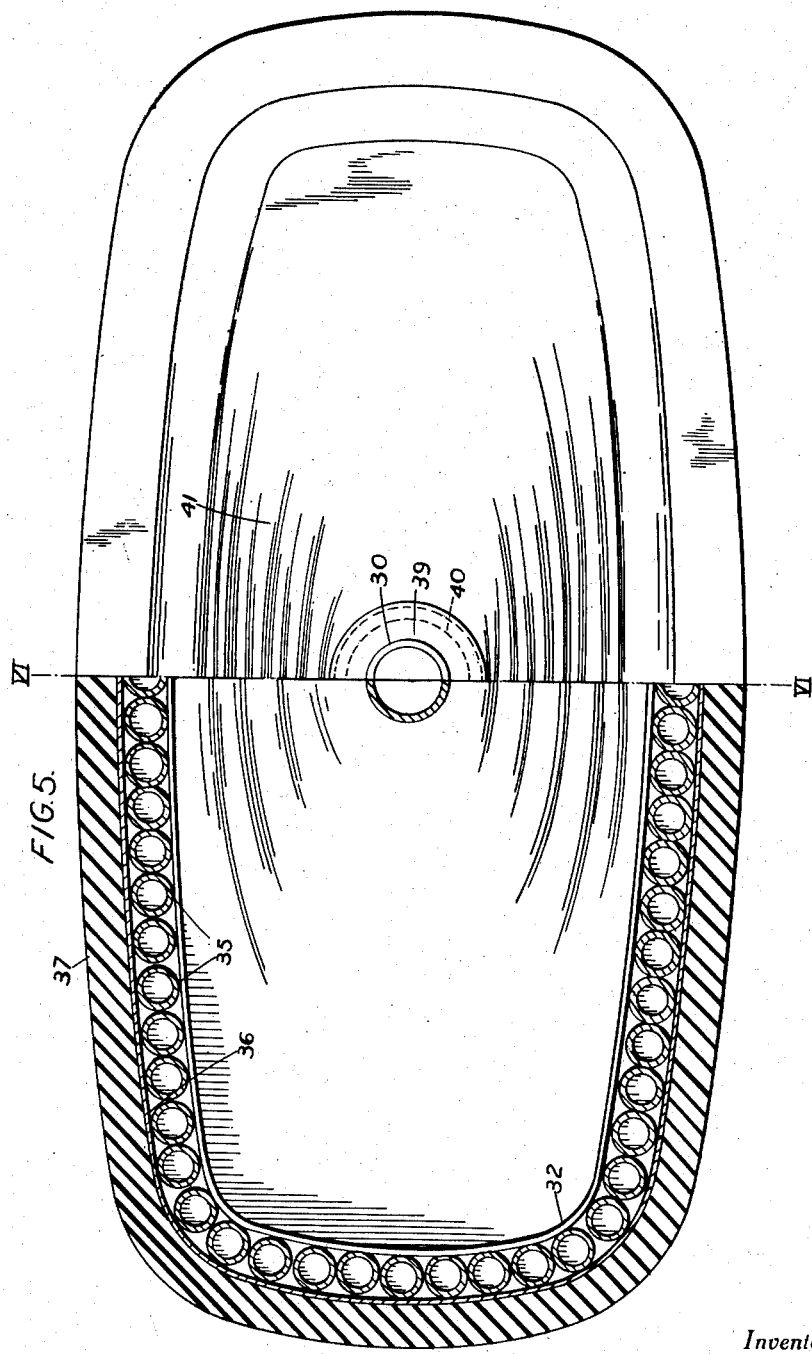
Inventor
OTTO SINGER,
By
Robert B. Pearson
Attorney

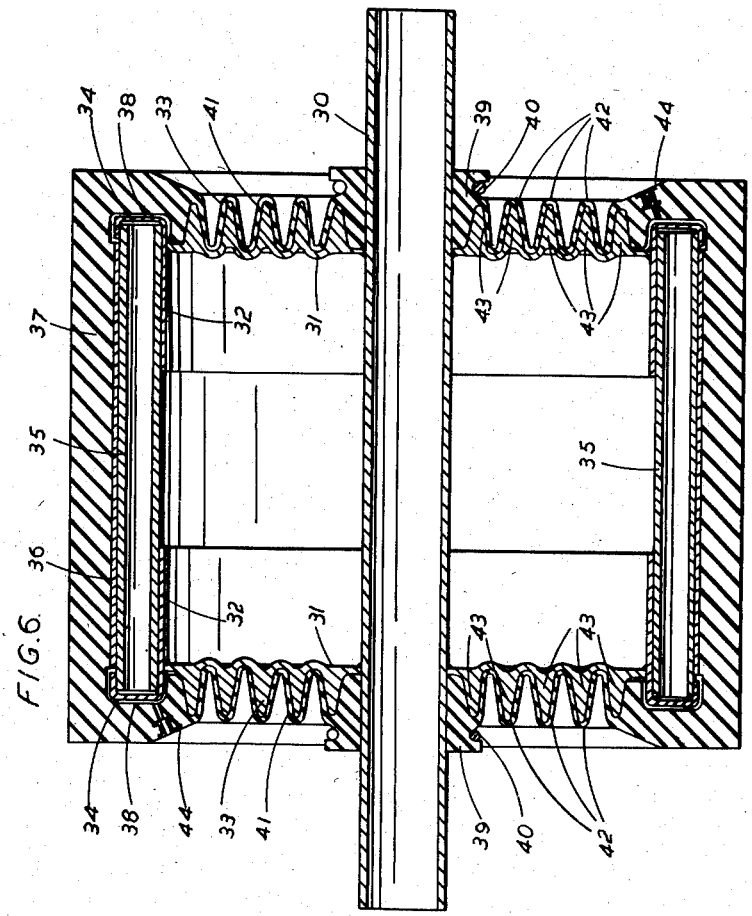

Patented Nov. 20, 1951

2,575,845

UNITED STATES PATENT OFFICE 2,575,845

TRAVELING ENDLESS TRACK

Otto Singer, London, England

Application June 15, 1948, Serial No. 33,125
In Great Britain June 17, 1947

14 Claims. (Cl. 305—10)

This invention relates to travelling endless tracks. Such tracks are used on vehicles for use on land and rough surfaces, and they can also be used as conveyors.

It is the principal object of the invention to provide a travelling endless track of a light and simple construction.

An important object of the invention is to provide an endless track comprising a supporting structure, a guide frame carried on said structure, said guide frame being shaped to determine the required track profile, a track element consisting of a flexible, substantially tubular envelope completely surrounding said guide frame and freely movable along the guide frame, and means for reducing friction between the guide frame and the track element.

A further object of the invention is to provide a novel endless track for use on a supporting structure, and comprising a guide frame and track element arrangement as set forth in the preceding paragraph.

Another object of the invention is to provide a self-laying track comprising a supporting drum rigidly mounted on an axle, said drum being elongated transversely to its axis to present a load supporting surface of shallow curvature, said drum having channels fixed to its periphery, a plurality of rollers arranged around the drum with their ends fitting in said channels, a track element comprising a flexible metallic strip encircling said rollers and a flexible endless sheath bonded to said strip and encircling the drum in slidable relationship therewith, sealing glands rotatably mounted on said axle adjacent the ends of said drum, and arcuately crimped discs of flexible material at each end of the drum, said discs being united centrally with said glands and peripherally with the ends of said track elements.

Another object is to provide a travelling endless track having a continuous flexible band without joints in its surface.

A further object is to provide a track construction which can be made small and light in weight in proportion to the ground contact area and which is therefore adaptable for use in aircraft landing gear.

Yet another object is to provide a track construction which can be made narrower than is feasible with conventional linked-metal tracks whereby the novel track is specially suitable for row-crop work. In the drawings:

Figure 1 is an elevation of a simple form of track with a part broken away to show the components in section view;

Figure 2 is a section, on an enlarged scale, of the portion of the track on the line II—II of Figure 1;

Figure 3 shows a portion of a track similar to that shown in Figure 1 but modified by the inclusion of anti-friction rollers in the core, some of the rollers being seen end on in the broken away section view in Figure 3;

Figure 4 is a section on an enlarged scale of a portion of the track in Figure 3 on the line IV—IV with a part of the upper roller broken away to show its construction in section view;

Figure 5 shows a further form of track, the portion to the right of the line VI—VI being an elevation view and the portion to the left of the line VI—VI being a central section view;

Figure 6 is an end elevation of the track in Figure 5 as seen on the line VI—VI of Figure 5.

Referring to Figure 1, the track is carried by a supporting structure which consists of a bar 10 carrying at either end, shafts 11 on which are mounted grooved wheels 12. These wheels 12 are provided with flanges 13, the inner faces of the flanges being inclined in the manner of a friction pulley as used for V-shaped belts. The flanges 13 on the wheels 12 thus constitute an external support for a track element 14 which is constructed as a flexible endless belt of vulcanised rubber, the short sides of the belt being inclined to make proper contact with the flanges 13 of the wheels 12 so that the track element 14 can turn in driven or in driving engagement with the wheels 12. The track element 14 has a continuous rectangular sectioned cavity within which an internal support acting as a guide frame for the track element consists of a substantially rigid looped steel core 15 arranged in fixed relationship with the wheels 12, and passing round the wheels 12 in arcs concentric therewith, the arcs being joined by straight sections extending between the two wheels 12 of which the lower section supports the lower length 14' of the flexible track element 14, in contact with the ground. The core 15 is sufficiently rigid to maintain its shape and position about the wheels 12, while the track 14 which embraces the core like a tube, slips over it as the track itself travels over the surface of the ground. In this example, the core 15 is shaped so that the lower length 14' of the track element 14 which makes contact with the ground, has at its extremities, a clearance between the bottom of the wheels 12 and the length 14', for the purpose of providing some resiliency in the track between the ground and the bar 10. Thus, when a cross section such as Fig. 2 is taken through a single reach of the core 15 and track element 14, the track element is seen as a tubular envelop completely surrounding the core (guide frame). The track element, as will be explained below, is freely movable on the core, this mobility being facilitated by lubrication, rollers or other friction reducing means located between the core and the track element.

The track element 14 is moulded around the core 15 in slidable engagement therewith by the method hereinafter described but in order to reduce friction between the track element 14 and the core 15 as far as possible and to reduce the risk of the track element 14 becoming punctured by nails or the like, the track element 14 is provided with flexible strip metal linings 16 and 17 which bear on the outer and inner long sides respectively of the core 15. Since the core 15 is made of steel, the strips 16 and 17 are preferably of bronze to provide a low frictional contact with the core 15. The bronze strips 16 and 17 are bonded to the track element 14 during vulcanisation of the latter, and lubricant is then injected into the track element further to reduce friction and wear. In manufacturing the track element 14, the bronze strips 16 and 17 are placed in position outside and inside the core 15 respectively and this assembly is then surrounded by uncured rubber mixed with a vulcanizing agent to form the track element 14, the short sides of the core 15 having been treated with one of the usual resist compounds to prevent adhesion of the rubber to the core 15 during vulcanisation. The track element 14 with the bronze strips 16 and 17 and the core 15 inside it are then placed in a mould, and heat and pressure are applied to vulcanise the rubber, at the same time causing adhesion between the bronze strips 16 and 17 and the track element 14. The mould is shaped to form treads as at 18 on the outside of the track element 14.

During the vulcanisation, nipples 19 are moulded into the track element at two points approximately equal distances from each other. After the moulding, lubricant is injected through the nipples 19 in an amount sufficient to distend the track element 14 slightly so that the bronze strips 16 and 17 do not bind on the core 15 and also to provide a clearance between the short sides of the core 15 and the adjacent inner faces of the track element 14 so that the track element 14 can slide freely on the core 15.

After prolonged use, cleaning fluid can be passed into one nipple 19 and out of the other nipple 19 to flush out the track, thereafter a fresh supply of lubricant being injected.

When installing the track on a vehicle, the bar 10 can be attached to a side of the vehicle in either fixed or pivotal relationship as desired, or again the wheels 12 can be attached to shafts 11 on the vehicle in which case the bar 10 in Figure 1 serves merely to illustrate the rigid mechanical connection between the shafts 11. As applied to a self-propelling vehicle, either or both of the wheels 12 can be driven, but in the case of a towed vehicle, obviously the wheels 12 are arranged to rotate freely on the shafts 11.

In the modified construction shown in Figures 3 and 4, the general configuration of the track is similar to that described in connection with Figures 1 and 2, but in the present case, it is arranged further to reduce friction between the track element 14 and the core 21 by providing an outer and an inner row of rollers 20 respectively to bear on the flexible bronze strips 16 and 17 respectively. The core in this case comprises an I-shaped continuous loop 21 provided with channels 22 and 23 in the flanges of the I-shaped core 21 on the outer side, and corresponding channels 24 and 25 in the flanges on the inner side. The channels 22 and 23 face each other and retain the rollers 20 on the outside of the core 21, while the channels 24 and 25 similarly retain the rollers 20 on the inside of the core 21. As seen in the broken away section of the upper roller 20 in Figure 4, the rollers are constructed for lightness' sake of cylindrical sections 26 with end caps 27 fixed in the ends of the rollers 26, the end caps 27 having spigots 28 of reduced diameter which fit in the channels 22 and 23 and thus prevent the rollers from falling away from the core 21.

During the moulding of the track element 14, the interior of the element 14 is maintained under fluid pressure to equalize the pressure applied externally in the moulding press. If this were not done there would be a tendency to bow inwards the portions of the flexible strips 16 and 17 between adjacent rollers 20 and thus obtain a series of shallow corrugations which would interfere with the smooth running of the track.

The track shown in Figures 5 and 6 is intended for use in vehicles and the like, to have an area of contact with the ground equivalent to that of a freely mounted wheel having an essentially larger perimeter than that of the track. The supporting structure in this case accordingly comprises a non-rotatable shaft 30 to which a pair of discs 31 is secured by welding. The discs 31 are spaced apart and carry drum sections 32 which are welded to the discs. The drum sections 32 and discs 31 are elongated to provide guide surfaces on the drum sections 32 on either side of the shaft 30, which are shallow in curvature, while these surfaces are joined continuously by end portions of more acute curvature. The drum sections 32 are bent outwards, upwards and inwards where they project beyond the discs 31 to form channels 34, the channels 34 facing each other and serving to retain the ends of a plurality of cylindrical rollers 35 arranged round the periphery of the drum sections 32. A flexible metal strip 36 envelopes the rollers 35 and forms a bearing base for a rubber track element 37 which is bonded to it. The track element 37 is located against the rollers 35 all the way round by means of the channels 34 which act as shoulders engaging corresponding shaped grooves 38 in the ends of the track section 37.

Sealing glands 39 are arranged rotatably on each end of the shaft 30 where it projects from the discs 36, the glands being held in rotational contact against the shaft by means of coiled springs 40. The whole structure of relatively movable parts constituted by the track element 37 and the discs 31 is sealed by means of discs of rubber 41 which are united centrally with the glands 39 and peripherally with the track element 37. In view of the pronounced variation in radius struck from the shaft 30 to the outside of the track element round the drum, the discs 41 are arcuately crimped or corrugated on the minor axis of the track so that the corrugations 42 can open out on the major axis of the track without appreciable stretching of the rubber.

In manufacture of the track, the rubber is moulded round the supporting structure and metal strip 36, and in order to produce the required corrugations 42 in the discs 41 during the moulding, the discs 31 are formed with a series of arcuate ribs 43 which are most pronounced on the minor axis of the track but diminish progressively to nothing towards the major axis. The disc 41, the shaft 30 and the outside of the channels 34 are all covered with a resist to prevent adhesion of the rubber during the moulding, though the metal strip 36 is treated in the known manner to produce adhesion between it and the track element 37. A pair of nipples 44 are moulded into opposite portions of the track element 37 during the vulcanisation and these are subsequently used for injection of lubricant into the track between the fixed structure and the rubber track element 37. Sufficient lubricant is injected, at the same time all air being bled out to distend the rubber envelope slightly so that the relatively movable parts of the track do not bind on one another. The nipples 44 are placed at opposite points so that the track can be flushed out and renewed with lubricant as and when desired.

In order to avoid distortion of the discs 33, drum sections 32 and flexible band 36 by the application of pressure during the moulding process, the cavity enclosed between the discs 31 is loaded under fluid pressure during the moulding to equalize the pressure imposed from outside.

It will be understood that without departing from the essential principles of my track construction described with reference to Figures 1 and 2, and 3 and 4 of the drawings, these said constructions where a friction drive for the rubber track element is employed, are adaptable for use as mechanical conveyors, the only difference being that the loading on the track is downwards in this case, whereas it is upwards when the track is used for supporting vehicles on the ground.

As is clear from the preceding description, an important feature of the present invention is the provision for relative movement between the core and the flexible sheath enveloping said core. This relative movement is facilitated by having friction reducing means interposed between the core and the sheath such that when the sheath begins to move under motive power supplied, for example, by a wheel 12, slippage will be permitted between the sheath and the core member due to the friction reducing means. That is to say, the sheath and the core are independent of one another and their relative movement is facilitated by the friction reducing means interposed therebetween, and any movement, either forward or backward, of the sheath member may be accomplished, at least initially, without accompanying movement of the core. Moreover, when the track member of the present invention is in the form of an endless belt extending around pulleys or the like, relative movement between the core member and the sheath may be effected due to the arc of the pulley and the resulting difference in the lengths of the paths of travel of the core and the sheath. This foregoing explanation is given to point out more clearly how the relative movement or slippage between the core member and the sheath is facilitated and why it is desirable.

I claim:

1. An endless track comprising a supporting structure, a guide frame carried on said structure, said guide frame being shaped to determine the required track profile, a track element consisting of a flexible substantially tubular envelope completely surrounding said guide frame and freely movable along it, and means located between the guide frame and the track element for reducing friction between the guide frame and the track element.

2. An endless track comprising a supporting structure, a guide frame carried on said structure, said guide frame being shaped to determine the required track profile, a track element consisting of a continuous flexible substantially tubular envelope completely surrounding said guide frame but freely movable thereon, a flexible metal strip interposed between the guide frame and the track element, said metal strip being bonded to the track element, and means for reducing friction between the guide frame and the track element.

3. An endless track comprising a supporting structure, a guide frame carried on said structure, said guide frame being shaped to determine the required track profile and having channels thereon, a plurality of rollers arranged in said channels on said guide frame, and a track element consisting of a continuous flexible substantially tubular envelope completely surrounding said guide frame in movable relationship therewith and a flexible metallic lining bonded thereto, said lining being adapted to bear on said rollers.

4. An endless track comprising a metallic core in the form of an elongated loop adapted to act as a giude frame, a track element consisting of an endless flexible tubular envelope completely surrounding said core and adapted to slide over same, and an external support for the track element arranged within the perimeter of said track element in contact therewith, said metallic core being sufficiently rigid to remain substantially stationary with regard to the axis of said wheel.

5. A self-laying track comprising a metallic core in the form of an elongated loop adapted to act as a guide frame, a track element consisting of an endless sheath of flexible material enveloping said core and a flexible metallic lining within said sheath and bonded thereto, said lining being adapted to slide freely over said core, and an external support for the track element comprising at least one flanged wheel arranged within the perimeter of said track element in frictional driving contact therewith.

6. A self-laying track comprising a metallic core in the form of an elongated loop adapted to act as a guide frame, and having channels thereon, a plurality of rollers arranged on both the inner and outer surfaces of the core and constrained by said channels to follow a course around the core, a track element comprising flexible metallic strips arranged both on the inner and outer surfaces of said core in rolling contact with said rollers, and an endless flexible tubular envelope completely surrounding said strips and said core, said envelope being bonded to said strips, and an external support for the track element comprising at least one flanged wheel arranged within the perimeter of said track element in frictional driving contact therewith, said metallic core being sufficiently rigid to remain substantially stationary with regard to the axis of said wheel.

7. A self-laying track comprising a supporting drum rigidly mounted on an axle, said drum being elongated transversely to its axis to present a load supporting surface of shallow curvature, channels fixed to the periphery of said drum, a plurality of rollers arranged around the drum with their ends fitting in said channels. a track element comprising a flexible metallic strip encircling said rollers and a flexible endless sheath bonded to said strip and encircling the drum in slidable relationship therewith, sealing glands rotatably mounted on said axle adjacent the ends of said drum, and arcuately crimped discs of flexible material at each end of the drum, said discs being united centrally with said glands and peripherally with the ends of said track elements.

8. An endless track for mounting on a supporting structure, said endless track comprising a guide frame, said guide frame being shaped to determine the required track profile, a track element consisting of a flexible substantially tubular envelope completely surrounding said guide frame and freely movable along it, and means located between the guide frame and the track element for reducing friction between the guide frame and the track element.

9. A track member as set forth in claim 8, wherein said envelope is non-metallic.

10. An endless track in accordance with claim 8, wherein said friction reducing means includes metallic lining on opposite inner faces of the envelope.

11. An endless track in accordance with claim 8, wherein said friction reducing means includes metallic lining on opposite inner faces of the envelope, the metal of said lining being different from the metal forming the guide frame.

12. An endless track in accordance with claim 8, wherein the envelope is rubber.

13. An endless track in accordance with claim 8, wherein the friction reducing means between the guide frame and the sheath is a lubricant enclosed within said envelope.

14. An endless track in accordance with claim 8, wherein the friction reducing means are metal rollers.

OTTO SINGER.

REFERENCES CITED

The following references are of record in the file of this patent:

UNITED STATES PATENTS

| Number | Name | Date |
|---|---|---|
| 401,367 | Peirce | Apr. 16, 1889 |
| 809,048 | Furchtbar | Jan. 2, 1906 |
| 1,101,316 | Moore | June 23, 1914 |
| 1,331,550 | Wishon | Feb. 24, 1920 |
| 2,055,932 | Kitchen | Sept. 29, 1936 |
| 2,301,341 | Stevens et al. | Nov. 10, 1942 |